Figure 1:
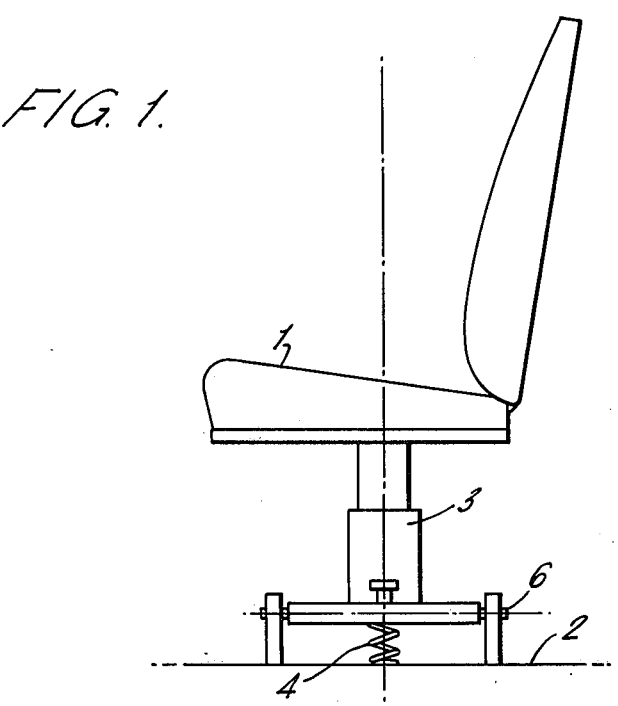

United States Patent [19]
Kokkila

[11] 4,057,213
[45] Nov. 8, 1977

[54] SEAT FOR WORK MACHINE OR VEHICLE

[75] Inventor: Kalevi Kokkila, Tampere, Finland

[73] Assignee: Rauma-Repola Oy, Finland

[21] Appl. No.: 650,034

[22] Filed: Jan. 19, 1976

[30] Foreign Application Priority Data

Feb. 6, 1975 Finland ............................ 0331/75

[51] Int. Cl.² ............................................ A45D 19/04
[52] U.S. Cl. ................................ 248/385; 297/314; 297/326
[58] Field of Search ............... 248/372, 376, 377, 382, 248/398, 385, 396, 399; 297/301–303, 307–309, 314

[56] References Cited

U.S. PATENT DOCUMENTS

| 522,387 | 7/1894 | Pederson | 248/385 |
| 2,707,986 | 5/1955 | Johnson | 297/314 X |

FOREIGN PATENT DOCUMENTS

| 515,835 | 8/1955 | Canada | 297/314 |

Primary Examiner—James C. Mitchell
Attorney, Agent, or Firm—Burns, Doane, Swecker & Mathis

[57] ABSTRACT

A seat for a work machine or vehicle is mounted to be laterally pivotable about an axis parallel to the longitudinal axis of the machine to permit the seat to accommodate to uneven terrain. Springs and shock absorbers are provided to absorb the shock of sudden changes in angular position. By restricting the seat to a lateral swinging motion, the driver maintains full control of steering and operation of foot pedals.

6 Claims, 1 Drawing Figure

U.S. Patent

Nov. 8, 1977

4,057,213

SEAT FOR WORK MACHINE OR VEHICLE

This invention relates to a driver's and/or operator's seat for use in a machine or vehicle employed in construction. Preferably the seat is provided with a mounting that accomodates vertical springing and absorbs shock.

Today greater attention and emphasis are placed on the suitability of and occupational health factors relating to the machine operator's work station. The work station may be the cab of the machine. It has been noted that for a machine moving in rough terrain, the properties of the driver's seat have considerable effect on the efficiency of the machine and on the driver's inclination to work.

In response to these considerations, the designs of seats have been improved. Moreover, the resilient mounting, shock absorption and adjustability of seats have been improved to accommodate the desires of individual drivers. Today, there exist rules defining the requirements and properties of seats.

By means of resilient mountings and shock absorption it is possible to reduce the noxious acceleration preceived by the driver. In a machine moving in rugged terrain, sudden deflections in a vertical direction and also in a lateral direction are generated when passing over obstacles. To reduce the noxiousness, resilient mounting in a vertical direction and shock absorption is common in all construction vehicle seats.

The object of a set according to this invention is to also reduce great accelerations generated in lateral direction when one or more wheels on one side of the machine pass over an obstacle in the terrain. A seat according to the invention is primarily characterized by being arranged to swing sideways and by being resiliently mounted with shock absorption. In this manner, the seat restricts and adjusts the lateral movement according to the weight of the driver and the requirements of the terrain.

Figure 2:
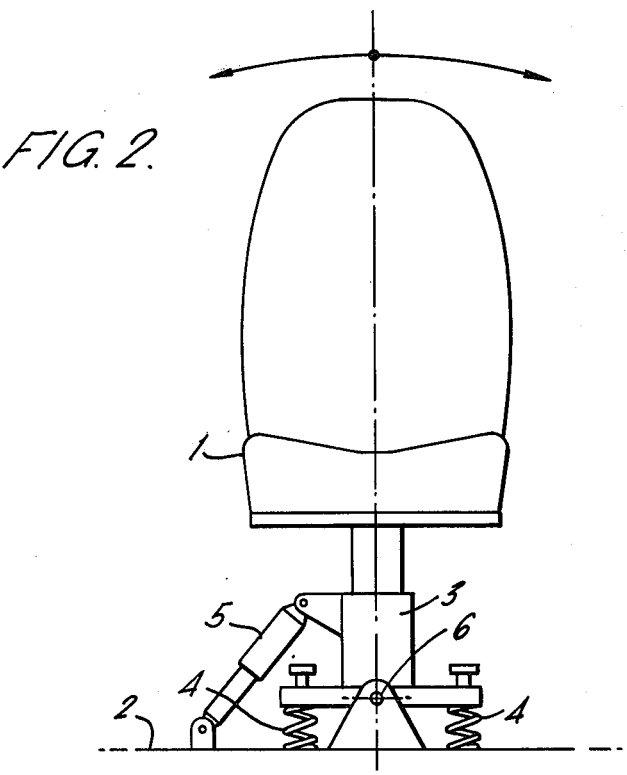

The seat of this invention is further illustrated in the accompanying drawing in which FIG. 1 shows a side view of a seat according to the invention, and FIG. 2 shows a front view of the seat of FIG. 1.

In a structure according to the invention, the lower part of a seat 1 is mounted to the construction machine or vehicle so as to pivot around an axis 6. The axis 6 is parallel to the longitudinal axis of the machine and is located in the lower part of the seat 1. The pivotal connection allows the seat to swing about the axis 6. The seat and its occupant are prevented from swinging freely and are restricted by means of suitably selected springs 4 and shock absorbers 5. The springs 4 and shock absorbers 5 may be adjustable according to the weight of the driver and to the operating conditions in order to achieve the best result. Controlled lateral movement of the seat can, of course, be provided in other ways: for example, by means of straight or curved slide rails. The bearing arrangement presented here, i.e., the pivotal connection, however, is apparently the simplest and cheapest.

When the axis 6 about which the seat is pivotally mounted is positioned near the floor 2 of the cab, the lateral movement of the seat does not cause any difficulty in the use of pedals. Moreover the restraint of the acceleration improves as the distance from the floor increases, so that the restraint is appropriately maximized at the driver's head.

Conventional vertical resilient mounting and shock absorption has been indicated by reference number 3 in the drawing.

The invention is not, of course, restricted to the embodiment shown in the drawing, it can vary in many ways in details within the scope of the claims.

I claim:

1. A driver's seat assembly in a work machine or vehicle for minimizing shock to the driver caused by sudden lateral and angular changes in position due to uneven terrain while permitting the driver to maintain maximum control over the control elements of said work machine or vehicle, said seat assembly comprising:
   a. a seat member;
   b. means for pivotably mounting said seat member in a work machine or vehicle for restricting movement of said seat member to lateral motion or swinging, said means for pivotably mounting being positioned at the cab floor, having a pivot axis in proximity to the floor, the pivot axis being generally parallel to a longitudinal axis of the work machine or vehicle; and
   c. means connected to said seat member and to said work machine or vehicle for damping lateral movement and absorbing the lateral shock caused by sudden changes in contour of terrain.

2. The seat assembly in accordace with claim 1, wherein the means for pivotably mounting the seat member comprises bracket means rigidly secured to the cab floor of the work machine or vehicle and pivot means rigidly secured to said seat member, said pivot means being pivotably mounted in said bracket means being pivotably mounted in said bracket means.

3. In a seat assembly for a work machine or vehicle, the seat assembly having a seat support above a floor and a seat member mounted on the seat support for resiliently restrained movement about a generally vertical axis, the improvement comprising:
   pivotal mounting means connecting the seat support to the work machine or vehicle for lateral swinging movement about an axis extending longitudinally of the work machine or vehicle;
   resilient support means connected between the seat support and the work machine or vehicle for holding the seat support in a generally vertical orientation and resiliently resisting movement of the seat support about the longitudinal axis; and shock absorbing means connected between the seat support and the work machine or vehicle for minimizing shocks associated with sudden angular and lateral changes in position of the machine or vehicle caused by uneven terrain.

4. The seat assembly of claim 3 wherein the longitudinal axis is positioned closely adjacent to the floor so that the seat support experiences primarily pivotal motion, as opposed to lateral displacement, during shocks associated with vehicular movement on uneven terrain.

5. The seat assembly of claim 3 wherein the resilient support means is adjustable to accommodate varying operating conditions.

6. The seat assembly of claim 3 wherein the shock-absorbing means is adjustable to accommodate varying operating conditions.

* * * * *